United States Patent [19]

Brems

[11] 4,343,073
[45] Aug. 10, 1982

[54] BASE SUPPORT FOR TRANSFER MACHINES

[76] Inventor: John H. Brems, 32867 White Oaks Trail, Birmingham, Mich. 48010

[21] Appl. No.: 141,601

[22] Filed: Apr. 18, 1980

[51] Int. Cl.³ .......................... B23P 23/00; B23Q 1/02
[52] U.S. Cl. .................................... 29/38 C; 29/33 P; 29/563; 408/234; 409/235
[58] Field of Search ............ 29/563, 564, 38 C, 33 P; 198/472, 345; 409/235, 238, 241; 408/234, 42, 43, 45, 35, 71

[56] References Cited

U.S. PATENT DOCUMENTS

| | | | |
|---|---|---|---|
| 3,060,813 | 10/1962 | Zwick | 409/235 |
| 3,286,595 | 11/1966 | Wollenhaupt | 409/235 |
| 3,668,772 | 6/1972 | Fink | 29/563 |
| 3,712,752 | 1/1973 | Varga | 408/43 X |
| 4,006,651 | 2/1977 | Anderson | 29/563 X |

FOREIGN PATENT DOCUMENTS 789028  1/1958  United Kingdom ............... 408/234

Primary Examiner—William R. Briggs
Attorney, Agent, or Firm—Barnes, Kisselle, Raisch & Choate

[57]     ABSTRACT

A structure for the rigidification of multiple station machine tools to increase accuracy of machining operations on workpieces moved intermittently on pallets to registry stations where machine tools move toward and away from the work. The machine tools and registry stations are mounted on a common base well below the axis of the machine tool movement. Means are interposed directly between the registry stations and the tool mounts on an axis in close proximity to the axis of the machine tool movement to rigidify the relationship between the tool mount and the registry stations and thus reduce the interfaces joining the two and the possibility of motion when tool pressure is applied to the work.

2 Claims, 5 Drawing Figures

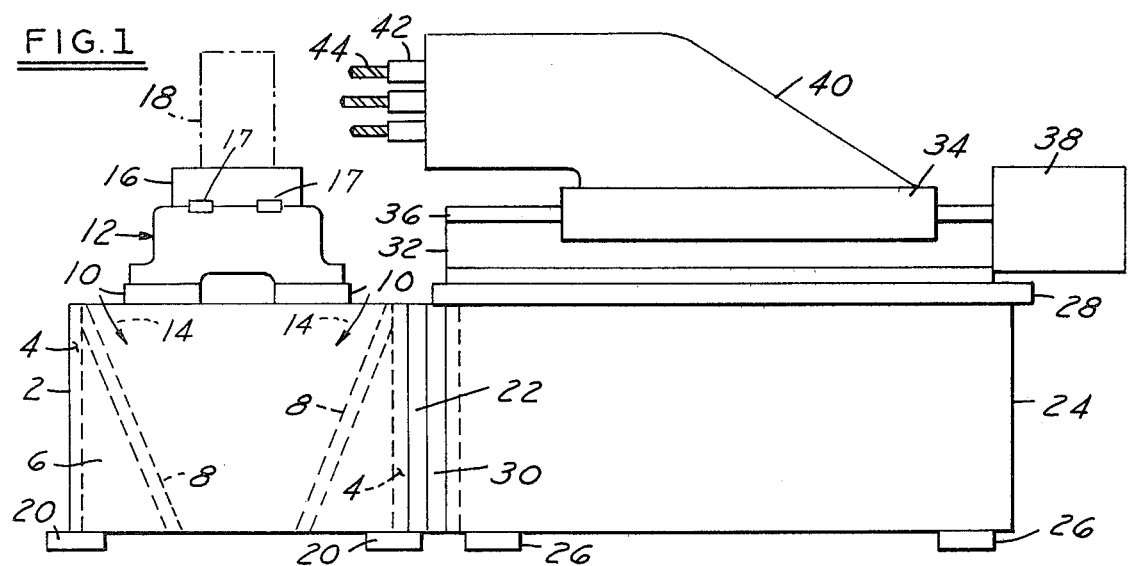
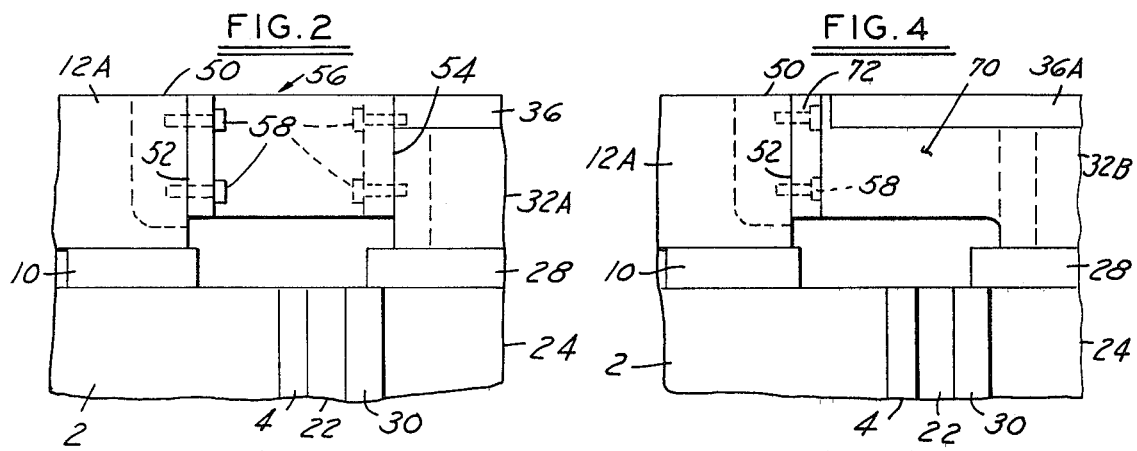
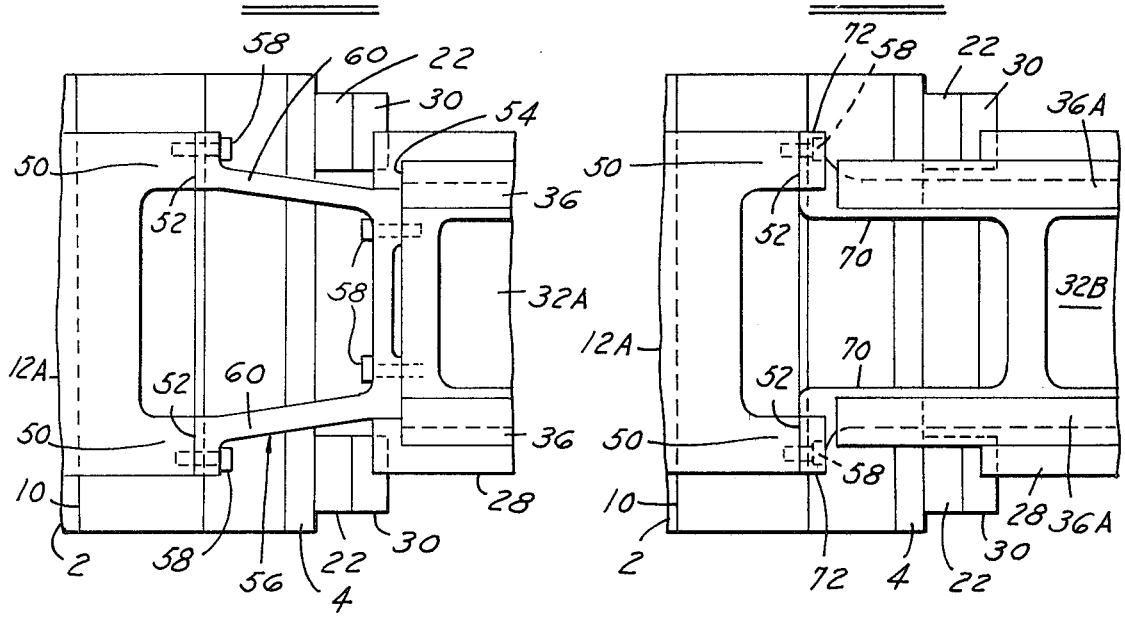

BASE SUPPORT FOR TRANSFER MACHINES

FIELD OF INVENTION

Transfer machines used in automation equipment wherein work holding pallets are moved from and to registry positions at respective work stations.

BACKGROUND OF INVENTION

In the field of multiple station, metal cutting transfer machines, workpieces are mounted in work holding fixtures known as pallets; these pallets are progressively moved through the machine from station to station, and are located and clamped in any given station by a mechanism referred to as a registry, which accurately locates the pallet and the workpiece carried on the pallet. The tooling, which performs a metal cutting operation on a workpiece in a given station, is mounted adjacent a work station on a slide movable relative to said workpiece and the slide is mounted on a slide base. It is the normal and customary practice to utilize a machine construction in which the registry and slide base are independently mounted to a suitable base structure.

It is one object of this invention to provide a structural configuration which provides greater stiffness and rigidity than the aforesaid customary structural practice and thus can result in better machining accuracy.

It is another object of this invention to provide a structural configuration in which the inherent rigidity and resulting accuracy is increased through a reduction in the number of interfaces between the parts.

Other objects of this invention will be apparent in the following description and claims in which, with the accompanying drawings, there is disclosed the principles of operation of this invention and the manner and process of using the invention directed to persons skilled in the art all in connection with the best mode presently contemplated for the practice thereof.

BRIEF DESCRIPTION OF DRAWINGS

DRAWINGS accompany the disclosure and the various views thereof may be briefly described as follows:

FIG. 1, a side elevation of a typical prior art machining station of a multiple station transfer machine.

FIG. 2, a partial side view related to FIG. 1 showing the invention.

FIG. 3, a plan view of FIG. 2.

FIG. 4, a partial side view related to FIG. 1 showing an alternate embodiment of the invention.

FIG. 5, a plan view of FIG. 4.

DETAILED DESCRIPTION OF THE MANNER AND PROCESS OF USING THE INVENTION

FIG. 1 illustrates a typical and commonly used structural arrangement for a single work station of a multiple station transfer machine, as viewed in the direction of the line of movement of pallet transfer. Referring to FIG. 1, a center base 2 is comprised of side plates 4 interconnected by transverse plates and intermediate ribs 6 welded into a box-type structure; slanted ribs, commonly referred to as chip sheds 8, are welded between the transverse plates and intermediate ribs 6. Registry support structural members or pads 10 are welded across the top edges of the transverse plates and intermediate ribs 6; the registry 12 is fixedly mounted on these members 10. It will be noted that on either side of the registry support members 10, a gap exists to the chip sheds 8. It is through these gaps, noted by the arrows 14, that the chips, generated by the machining process, fall through the top of the center base, to be guided by the chip sheds 8 and become collected in a disposal system built into the supporting floor. The registry 12, fixedly mounted on the support members 10, is a mechanism designed to support, locate and clamp a pallet 16 on which is clamped a workpiece 18. Examples of the construction of registries 12 are shown in my copending appliations, Ser. No. 950,318, filed Oct. 11, 1978, now abandoned, and Ser. No. 957,300, filed Nov. 2, 1978, U.S. Pat. No. 4,201,284. The pallet 16 may ride on slide rails 17 or it might be moved to a registry by a lift and carry system.

The entire center base 2 is supported on the floor and bolted to it through mounting feet 20. Two vertical mounting pads 22 are welded to one side of the center base 2, and to them is bolted a wing base 24 to be described.

A wing base 24 is generally built as a welded box structure, suitably internally ribbed, supported from the floor by feet 26 and capped with a mounting plate 28, on which is mounted the tool feed mechanism to be described. The wing base 24 is provided with mounting flanges 30 through which it is bolted to the mounting pads 22 on the center base 2. In some applications, the wing base 24 and center base 2 are fabricated as a single structure, but even with this arrangement, the registry support members 10 and the mounting plate 28 are substantially coplanar for horizontal tool feed applications.

In some stations in which the workpiece is machined from both sides, another wind base may be bolted to the other side of the center base or made integral with it.

On the mounting plate 28 of the wing base 24 is mounted a tool feed assembly, which is comprised of a slide base 32 bolted to the plate 28, and a tool feed carriage 34 slideably mounted to the slide base 32 through ways 36. The carriage 34 is driven horizontally on the slide base 32 by a feed mechanism 38 which may be a hydraulic cylinder, lead screw and nut mechanism or the like. A precision high speed rapid advance and feed mechanism is shown in my copending application, Ser. No. 64,502, filed Aug. 7, 1979 U.S. Pat. No. 4,271,710.

On the carriage 34 is illustratively mounted a multiple spindle drill head 40 of conventional construction. Three spindles 42 are journalled in the drill head 40, geared together and driven by a suitable motor, not shown. Each spindle 42 carries a drill 44 for drilling a specific hole in the workpiece 18. After a given pallet 16 has been transferred into the illustrated station and is located and clamped by the registry 12, the conventional electrical control system causes the carraige 34 to move forward (to the left) at a relatively high speed until the tools are in close proximity to the workpiece at which time, the carriage speed is reduced to a predetermined feed speed and the tools are fed into the workpiece. After a predetermined depth of tool penetration has been achieved, the carriage 34 is returned at high speed to its starting position.

It will be understood that the drills 44 in FIG. 1 are illustrative tooling only. Among other types of tooling used in machine stations of this type are reamers, milling cutters, boring tools, or facing tools of various type, etc. These cutters may be used singly or in multiple numbers in a given station.

A common denominator of these various operations is that a considerable feed thrust is required on the carriage 34 to feed the tools into the workpiece 18. This thrust is reacted by the workpiece and is transferred by it through the pallet, registry, center base, and wind base back to the slide base, thereby completing the force loop. Since these thrust forces may reach large magnitudes, into the tens of thousands of pounds, structural rigidity to minimize defections is very important. As can be seen from FIG. 1, the entire stack of elements mounted on the center base, comprised of the registry 12, pallet 16, and workpiece 18, is a column subjected to side loading from the thrust of the tools. The effective height of this column, which is analogous to the length of a cantilever beam, can be significantly reduced in accordance with the present invention by a direct structural tie between the forward end of the slide base and the registry, thereby adding appreciably to the stiffness of the entire structure.

One embodiment of such a direct structural connection is shown in FIGS. 2 and 3, in which parts and related reference characters common to FIG. 1 are used. In this embodiment, this connection is a separate element formed to react the separating loads between the registry and slide base which are created by the tool thrust. Referring to FIGS. 2 and 3, the registry 12A is slightly modified by having formed into its housing (without affecting its functional operation) two bosses 50 terminating in accurately machined faces 52. Similarly, the front face 54 of the slide base 32 is also accurately machined. Between the faces 52 and 54 is fitted an interconnecting member 56 forming a very rigid structural connection between the registry 12A and the slide base 32A; this interconnecting member 56 is bolted to the slide base 32A and registry 12A by suitable bolts 58. It can be seen, FIG. 3, that the interconnecting member 56 is comprised of two ribs 60 which act principally in tension as they react the thrust loads imposed by the tooling. This configuration, utilizing the direct acting ribs 60, does not impede the normal flow of chips from the machining operation.

A second embodiment is shown in FIGS. 4 and 5; in this embodiment the structural connection between the registry and the slide base is made by adding extension ribs to the slide base which connect directly to the registry. Referring to FIGS. 4 and 5, the sidewalls 70 of the revised slide base 32B are extended forward (to the left) where they are terminated in flanges 72 which are directly bolted to the faces 52 of the bosses 50 of the registry 12A. This construction also permits the extension of the ways 36A almost to the registry as can be seen in FIGS. 4 and 5. This extension of the ways permits the carriage 34, FIG. 1, to move closer to the registry, pallet, and workpiece than is possible in the typical construction shown in FIG. 1; and this in turn permits a construction of the drillhead 40 which reduces the tooling overhang beyond the forward end of the carriage, again adding increased stiffness and rigidity to the overall machining force loop. The extension of the ways 36A almost to the registry 12A slightly decreases the chip clearance space, but there is still sufficient space remaining between the ways 36A and outboard of them to provide adequate chip flow.

It is also possible to fabricate the slide base and the housing for the pallet registry as a single cast or welded member, in which case the interface as shown by faces 52 in FIGS. 4 and 5 is eliminated; this provides the ultimate in accuracy and rigidity.

In the prior art shown in FIG. 1 and the structural improvements of FIGS. 2-5, the line of action of the carriage 34 on the slide base 32 is shown as being horizontal. This need not be the case. In many of the operations, the line of action of the carriage 34 is inclined from the horizontal all the way up to a vertical line of action. The structural direct connection between the slide base and the registry, horizontally illustrated in FIGS. 2-5 can be applied with equal validity and benefits to the non-horizontal lines of action.

In the descriptions above, the wing base and tool slide mechanism are shown as existing only on one side of the center base and registry. In many work stations, a wing base and tool slide mechanism exists on both sides of the center base and registry. In such cases, it can be seen that a comparable or identical structural tie can be employed between the registry and both slide bases.

In accordance with the present invention, the pallet registry base and the tool slide base, mounted on a common support, such as the floor, together form the machine base. The registry and the tool slide extend upwardly from this machine base. The present invention provides a solid bridge connection between the pallet registry and the tool slide support on an axis in close proximity to the force axis of the machine tool operation. This direct positive connection bridge substantially reduces the bending moment caused by the tool forces and reduces to a minimum the interface connections between the parts which can lead to any motion resulting from the tool forces.

What I claim is:

1. In a multiple station transfer machine in which workpieces are located and clamped in pallets and in which said pallets are sequentially moved on rails from station to station to be located on registry means at each station independent of said rails and in which each working station comprises:
   1. base means,
   2. registry means rigidly mounted on said base means and adapted to support, locate, and clamp a pallet in a fixed position, and
   3. tooling means mounted on said base means and adapted to feed tools on a first axis into said workpiece supported on a pallet and in turn on said registry means, that improvement which comprises a direct, positive, in-line connection means extending between and rigidly connecting said registry means and said tooling means on a second axis in close proximity to said first axis and exclusive of the indirect connection therebetween through said base means, said in-line connection means being structured to transmit compression and tension forces between said registry means and said tooling means.

2. In a multiple station transfer machine in which workpieces are located and clamped in pallets and in which said pallets are sequentially moved from station to station along rails to registry means at each station and in which each working station comprises:
   1. base means,
   2. registry means fixedly mounted on and above said base means and adapted to vertically support a work supporting pallet and locate and clamp the pallet in a fixed position independent of said rails and in a generally horizontal plane, and
   3. tooling means comprising a slide base mounted on and above said base means in laterally exposed relation to said registry means and tool means slideably supported on said slide base and adapted to feed tools on a first generally horizontal axis toward and away from a workpiece supported on said pallet and in turn on said registry means, that structural improvement which comprises means forming a contiguous substantially direct, positive in-line structural connection means which extends laterally between and is rigidly connected to said registry means and said slide base on an axis spaced above said base means in close proximity to said first axis said connection means being structured to transmit both compression and tension forces between said registry means and said slide base, wherein said connection means is rigidly connected at one end to the upper portion of said registry and is rigidly connected at the opposite end to the upper portion of said slide base.

* * * * *